Dec. 11, 1962   F. E. SATCHELL   3,068,007
PLASTIC BOWLING BALL AND METHOD OF MAKING SAME
Filed March 9, 1959
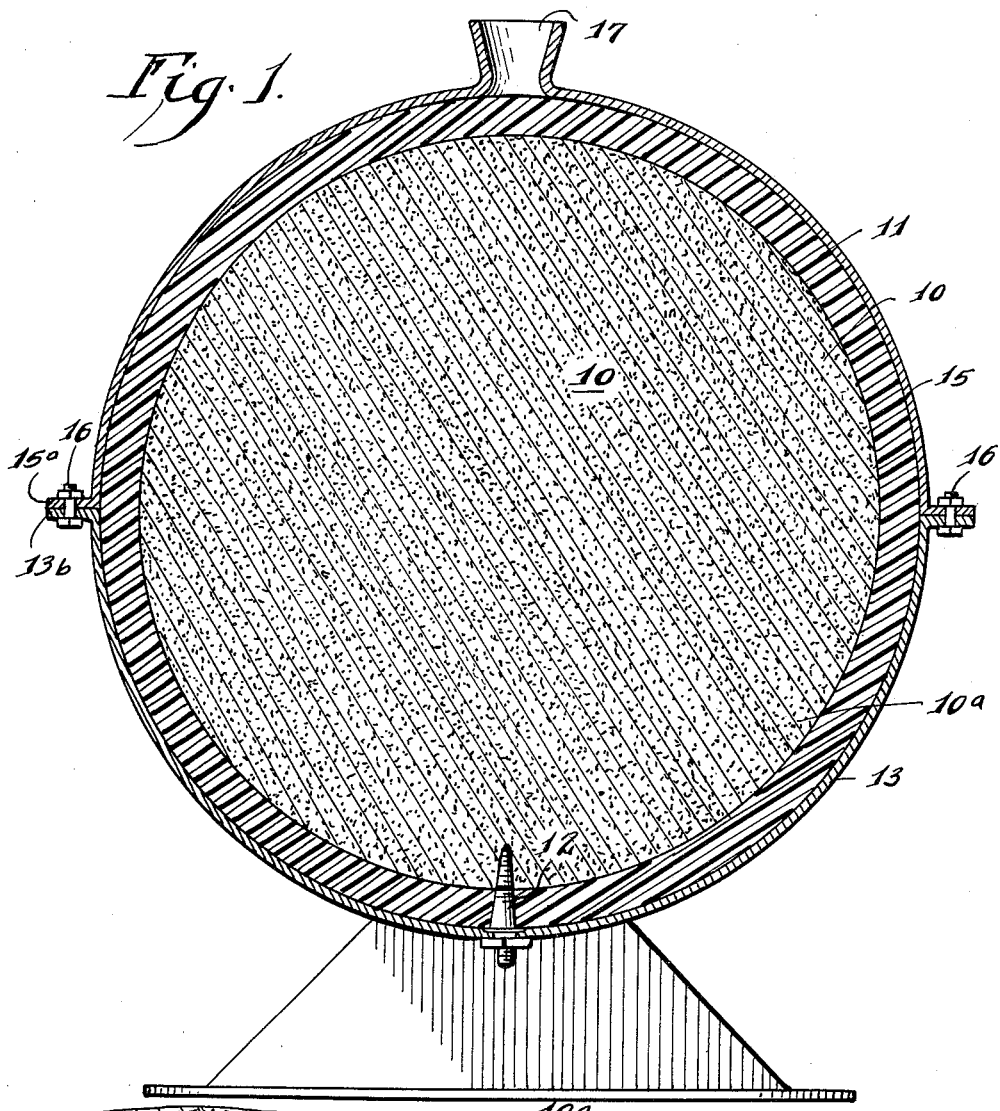
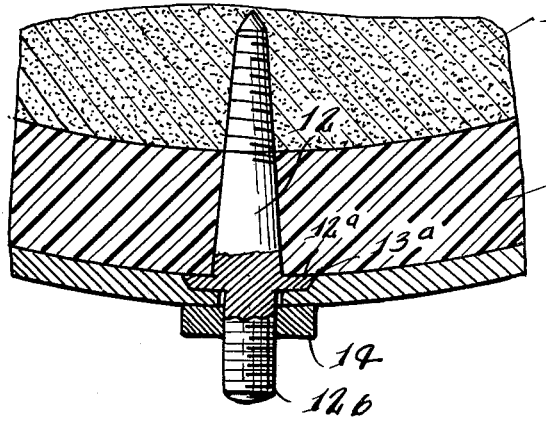
Inventor.
Fred E. Satchell.
By Hofgren, Brady, Wegner
Allen & Stellman
Attorneys.

3,068,007
PLASTIC BOWLING BALL AND METHOD OF
MAKING SAME
Fred E. Satchell, Muskegon, Mich., assignor to Brunswick Corporation, a corporation of Delaware
Filed Mar. 9, 1959, Ser. No. 798,234
16 Claims. (Cl. 273—63)

This invention relates to bowling balls and more particularly plastic bowling balls and methods for making the same.

It has been customary in the art of manufacturing bowling balls to provide a core cover of hard rubber which is opaque and generally black in color. This hard rubber cover is molded about the core of the ball and then vulcanized in place. This molding and vulcanizing requires extensive equipment.

Production of balls of other colors is rather difficult because of the residual color, due to carbon black for example, which tends to remain in the molding and vulcanizing equipment. This residual color will contaminate subsequent balls of other colors run in the same equipment. In order to provide other colors in the core covers it is then necessary to either provide separate equipment or completely and carefully clean all the production equipment which is time consuming and expensive.

The color combinations possible in hard rubber core covers are also limited. Generally, the core covers are solid colors or solid colors with marbled contrasting colors.

The plastic bowling ball of this invention obviates the problem of color contamination of the manufacturing equipment because the core cover is made of a translucent polyester plastic material which is handled very easily during the maufacturing process. Thus other colors may easily be made in the same equipment. It is also possible to provide a large and varied group of color combinations and color effects in the plastic cover. Yet this plastic cover is as durable as a hard rubber cover.

It is therefore an object of this invention to provide a bowling ball which can be made in almost any color or effect.

It is another object of this invention to provide such a bowling ball which can be made in varied colors without requiring equipment cleaning or changes.

It is a still further object of this invention to provide a bowling ball having greatly improved appearance qualities which is as durable and long lasting as hard rubber covered bowling balls.

It is a yet further object of this invention to provide a bowling ball which comprises a core and a cover surrounding the core comprising a cured polyester resin.

It is still another object of this invention to provide a method for making a bowling ball including the steps of molding a spherical core, surrounding said core with a polyester resin cover, and curing said cover.

Other objects and advantages of this invention will become apparent from the following description taken together with the accompanying drawings.

Of the drawings:

FIGURE 1 is a sectional view taken vertically through the center of a mold and showing a vertical section of a bowling ball in place therein; and FIGURE 2 is an enlarged partial vertical sectional view of the pin shown supporting the bowling ball in FIGURE 1.

Referring now to the drawings, the bowling ball of this invention comprises a core 10 and a core cover 11. The core 10 is generally made of sawdust bonded together by a thermo-set resin such as a polyester resin or similar epoxy, urea or phenolic resins. The weight of the sawdust core determines the weight of the ball and it may be varied by the addition of denser materials such as barium sulfate. The core 10 is also so constructed so that one-half 10a will be slightly heavier than the other half. This is done by including a larger amount of high density material such as barium sulfate in that half of the core. This is done to balance the ball since the finger holes are drilled so as to extend into the heavier half of the core.

The sawdust and barium sulfate materials are molded into a spherical shape in a mold similar to that shown in FIGURE 1 and held together by a cured rigid polyester resin. One example of a rigid polyester resin which is satisfactory for this purpose is given in the following table:

*Rigid Polyester Resin*

| | Percent by weight |
|---|---|
| Butylene glycol | 21 |
| Diethylene glycol | 23.3 |
| Isophthalic acid | 37.9 |
| Fumaric acid | 17.66 |
| Triphenyl phosphite | .1 |
| Hydro quinone | .2 |

65% in styrene or vinyl toluene.

It is also desirable to use a small amount of a catalyst in order to decrease the curing time of the polyester resin bond. A satisfactory catalyst for this purpose is a 60% solution of benzoyl peroxide in dioctyl phthalate.

The following table gives the proportions of materials necessary to provide about 50 various weight sawdust cores for 13 to 16 pound balls:

| | 13# Ball, lbs. | 14# Ball | | 15# Ball | | 16# Ball | |
|---|---|---|---|---|---|---|---|
| | | Lite Side, lbs. | Heavy Side, lbs. | Lite Side, lbs. | Heavy Side, lbs. | Lite Side, lbs. | Heavy Side, lbs. |
| Softwood Flour Lignum SM Pine | 119.0 | | | | | | |
| Hardwood Sawdust | | 86.3 | 43.2 | 79.3 | 39.7 | 79.3 | 39.7 |
| Barium Sulfate | | | 12.5 | 78.0 | 51.5 | 106.0 | 65.5 |
| Rigid Polyester Resin | 119.0 | 79.3 | 39.7 | 88.7 | 44.3 | 105.0 | 52.5 |
| 60% Solution Benzoyl Peroxide in Dioctyl Phthalate | 2.4 | 1.6 | 0.8 | 1.8 | 0.9 | 2.1 | 1.05 |
| Total | 240.4 | 167.2 | 96.2 | 247.8 | 136.4 | 292.4 | 158.7 |
| Per Core Portion | | 3.34 | 1.92 | 4.96 | 2.73 | 5.85 | 3.17 |
| Core Weight | 4.81 | 5.26 | | 7.69 | | 9.02 | |

In compounding the cores, a small amount of the polyester resin is first added to the benzoyl peroxide and stirred thoroughly to make a paste. This paste is then added to the remainder of the polyester resin. The proper weight of the sawdust, which has been predried, is added to a mixer along with the catalyzed resin. The correct weight of the barium sulfate is added to the mixture and mixing is continued until the mass is homogeneous. The mixer is then emptied and if necessary the mass is hand mixed to eliminate any resin rich or resin deficient portions. The mixed stock is then formed into the core shape with the heavy stock on one side and the light on the other, and cured for about 10 minutes at 350° F. Thereafter, it is allowed to cool for several hours to return to room temperature. The cool core is then roughturned to a diameter of approximately 6¾ inches.

The polyester resin cover is applied over the molded sawdust core. There are many satisfactory polyester resins, which can be cured in place about the sawdust core. It is necessary, however, to use a resin which is similar in hardness when cured to that of hard rubber which has a Rockwell Number of about 80. This can be done by using a resin having the necessary properties or by mixing together amounts of flexible polyester resins and rigid polyester resins. For example, a 1:1 mixture of the rigid polyester resin previously given and the flexible polyester resin given here will provide a satisfactory material.

*Flexible Polyester Resin*

|   | Mol percent |
|---|---|
| Adipic acid | .2 |
| Maleic anhydride | .6 |
| Phthalic anhydride | 1.2 |
| Propylene glycol | 1.1 |
| Diethylene glycol | 1.1 |
| Hydro quinone | 1.2 |

65% in Styrene or Vinyl Toluene.

[1] Of total weight.

Small amounts of a catalyzer are also added to the polyester resin or mixture of resins in order to speed the curing time. Such catalysts as a 60% solution of cobalt naphthanate in dioctyl phthalate and a 60% solution of methyl ethyl ketone peroxide also in dioctyl phthalate have proved very satisfactory.

In one example of preparing a batch of the polyester resin cover for the sawdust core, 6.134 pounds of the 1:1 blend of rigid and flexible polyester resins is placed in a container. Thereafter, 0.18 pound of the cobalt naphthanate is added and stirred until the color of the mixture is uniform. Then 0.18 pound of methyl ethyl ketone peroxide is added and stirred. The resin is then ready for casting about the core of the bowling ball. It should be used within one hour after adding the methyl ethyl ketone peroxide as polymerization and curing will begin taking place.

In casting the bowling ball of this invention, the support pin 12 is screwed into the heavy side of the sawdust core 10 as indicated in FIGURE 1. The heavy side of the core is determined by placing it in a mercury bath. The core is then placed in the bottom part of the mold 13 on the pin 12. As can be more clearly seen in FIGURE 2, the pin 12 has an outwardly extending flange 12a which is designed to fit in the recessed portion 13a of the mold 13. The nut 14 is then threadedly received on the bottom of the pin 12b and taken up against the outer edge of the mold 13. This arrangement holds the sawdust core steady in the center of the mold.

The top of the mold 15 is then put in place with the flanges 15a and 13b in contact, and the flanges bolted together by the studs 16. The polyester resin mixture previously described is then introduced to the mold around the core through the opening in the top of the mold at 17. Before the mold is used, the inner surface thereof is generally covered by a thin film of a polysiloxane which has a viscosity of about 200 centistokes at 30° C.

The filled mold is placed in a water bath at a temperature of about 87° F. plus or minus 3° F. After 16 hours in the water bath, the mold is removed and disassembled. The ball is then placed on a lathe and turned to a diameter of 8.63 inches. Thereafter, it is baked for 16 hours at about 150° F. plus or minus 5° F. and six hours at about 190° F. plus or minus 5° F. These baking times, however, are not critical and overbaking will not harm the ball.

After the baking step is completed, the ball is gradually cooled to room temperature and finished to a smooth highly polished outer surface. The aperture made in the ball by the support pin 12 is eliminated by drilling one of the finger holes through it.

Because of the transparent character of the polyester cover of the bowling ball of this invention, it is possible to provide many unusual appearances and effects in the bowling balls. For example, powders or flakes can be used in several different ways. Plastic or aluminum flakes or powders and powders of other metals such as copper, bronze and brass can be suspended in the resin. Suspension is achieved by increasing the resin viscosity slightly so that the settling rate will be negligible. High viscosity or partial gelation is produced with gelling agents such as aluminum soaps or resins cooked to a high viscosity. Casting at the moment gelation is promoted in the resin by suitable catalysts and accelerators such as those already described will also give the desired suspension.

Metal powders can also be suspended in a suitable resin solution or lacquer and sprayed on the outer surface of the sawdust core. Also the core can be soaked in resin and dusted with metal or plastic powders or flakes. A clear cover is cast over these cores. The cover though clear may also be colored.

Pearlescent (pearl-like) materials can be added to the cover resin also. This has been done either with or without pigments or dyes to produce startling effects. Pearlescents of both organic origin such as fish scales or inorganic origin such as lead salts and mica can be used. It is possible to use a colored core and transparent or translucent pearl cover resin to give an unusual color blending effect.

Painted cores with a clear or tinted cover can have decorations, identification, names, crowns and the like, adhered before casting of the cover. Painted cores with translucent covers give unusual color blending effects. Cores can also be metalized using high vacuum aluminum deposition. This effect might also be achieved with spray metal or electro deposition.

Mottled patterns have been made using different color resins, one of which was thickened to prevent color blending. The colors could be either transparent, translucent or clear. Solid color translucent balls can be made using various amounts of pigments to almost totally obscure the core. This effect gives great depth to the color of the ball.

Fabric covered cores are possible to give the ball interest as to texture, color and pattern. High energy X-ray or particle beams can be used to imprint names, insignia, logo or designs on the ball.

None of these unusual and startling external appearances have been possible in hard rubber balls heretofore known. Thus the plastic bowling ball of this invention can be produced with extremely interesting and desirable appearance.

Having described my invention as related to the embodiments set out herein, it is my intention that the invention be not limited by any of the details of description, unless otherwise specified, but rather be construed broadly within its spirit and scope as set out in the accompanying claims.

I claim:

1. A bowling ball comprising: a sawdust core impregnated with a rigid polyester resin as a binder, said resin comprising the reaction product of butylene glycol, diethylene glycol, isophthalic acid and fumaric acid; and a cover surrounding said core comprising a cured mixture in a ratio of about 1:1 of said rigid polyester resin and a flexible polyester resin comprising the reaction product of adipic acid, phthalic anhydride, maleic anhydride, propylene glycol and diethylene glycol, said cured mixture having a Rockwell Number of about 80.

2. The method of making a bowling ball, comprising the steps of: molding a spherical sawdust core impregnated with a rigid polyester resin comprising the reaction product of butylene glycol, diethylene glycol, isophthalic acid and fumaric acid, curing said core resin, surrounding said core with a polyester resin cover comprising a mixture of said rigid polyester resin and a flexible polyester resin comprising the reaction product of adipic acid, phthalic anhydride, maleic anhydride, propylene glycol and diethylene glycol, said mixture having a Rockwell Number of about 80 when cured, and curing said cover.

3. The method of making a bowling ball, comprising the steps of: molding a spherical sawdust core impregnated with a rigid polyester resin comprising the reaction product of butylene glycol, diethylene glycol, isophthalic acid and fumaric acid, curing said core resin for about ten minutes at 350° F., surrounding said core with a polyester resin cover comprising a mixture of said rigid polyester resin and a flexible polyester resin comprising the reaction product of adipic acid, phthalic anhydride, maleic anhydride, propylene glycol and diethylene glycol, said mixture having a Rockwell Number of about 80 when cured, and curing said cover in a water bath at about 87°±3° F. for about 16 hours and thereafter baking said ball.

4. The process of claim 3 wherein said ball is baked for about 16 hours at about 150°±5° F. and for about 6 hours at about 190°±5° F.

5. A bowling ball comprising: a sawdust core impregnated with a thermo-set resin as a binder and a translucent cover surrounding said core comprising a cured mixture of rigid and flexible polyester resins providing play characteristics suitable for bowling, said core having an artistic outer surface appearance provided by applying a member of the class consisting of paint, resins and particulated metals.

6. A bowling ball comprising: a sawdust core impregnated with a thermo-set resin as a binder and a translucent cover surrounding said core comprising a cured mixture of rigid and flexible polyester resins providing play characteristics suitable for bowling, said cover including embedded artistic material selected from the class consisting of plastic flakes, plastic powders, particulated metals and pearlescent materials.

7. The method of making a bowling ball comprising the steps of: molding a spherical sawdust core, providing an artistic outer surface appearance on said core by applying a member of the class consisting of paint, resins and particulated metals, surrounding said core with a polyester resin cover comprising a mixture of rigid and flexible polyester resins providing play characteristics suitable for bowling, and curing said cover.

8. The method of making a bowling ball comprising the steps of: molding a spherical sawdust core, surrounding said core with a polyester resin cover comprising a mixture of rigid and flexible polyester resins providing play characteristics suitable for bowling, said resin including artistic material selected from the class consisting of plastic flakes, plastic powders, particulated metals and pearlescent materials, and curing said cover.

9. The method of making a bowling ball comprising the steps of: molding a spherical sawdust core impregnated with a thermoset resin, curing said core resin, providing an artistic outer surface appearance on said core by applying a member of the class consisting of paint, resins and particulated metals, surrounding said core with a polyester resin cover comprising a mixture of rigid and flexible polyester resins providing play characteristics suitable for bowling, and curing said cover resin.

10. The method of making a bowling ball comprising the steps of: molding a spherical sawdust core impregnated with a thermo-set resin, curing said core resin, surrounding said core with a polyester resin cover comprising a mixture of rigid and flexible polyester resins providing play characteristics suitable for bowling, said resin including artistic material selected from the class consisting of plastic flakes, plastic powders, particulated metals and pearlescent materials, and curing said cover resin.

11. A bowling ball comprising: a core and a translucent cover surrounding said core comprising a cured polyester resin providing play characteristics suitable for bowling of a cured mixture of rigid and flexible polyester resins, said core having an artistic outer surface appearance provided by applying a member of the class consisting of paint, resins and particulated metals.

12. A bowling ball comprising: a core and a translucent cover surrounding said core comprising a cured polyester resin providing play characteristics suitable for bowling of a cured mixture of rigid and flexible polyester resins, said cover including embedded artistic material selected from the class consisting of plastic flakes, plastic powders, particulated metals and pearlescent materials.

13. The method of making a bowling ball comprising the steps of: molding a spherical core, providing an artistic outer surface appearance on said core by applying a member of the class consisting of paint, resins and particulated metals, surrounding said core with a polyester resin cover comprising a mixture of rigid and flexible polyester resins providing play characteristics suitable for bowling, and curing said cover.

14. The method of making a bowling ball comprising the steps of: molding a spherical core, surrounding said core with a polyester resin cover comprising a mixture of rigid and flexible polyester resins providing play characteristics suitable for bowling, said resin including artistic material selected from the class consisting of plastic flakes, plastic powders, particulated metals and pearlescent materials, and curing said cover.

15. A bowling ball comprising: a core and a translucent cover surrounding said core comprising a cured mixture of rigid and flexible polyester resins providing play characteristics suitable for bowling, said cover including embedded pearlescent materials.

16. The method of making a bowling ball comprising the steps of: molding a spherical core, surrounding said core with a polyester resin cover comprising a mixture of rigid and flexible polyester resins providing play characteristics suitable for bowling, said resin including pearlescent materials, and curing said cover.

References Cited in the file of this patent

UNITED STATES PATENTS

| | | |
|---|---|---|
| 1,622,421 | Coffield | Mar. 29, 1927 |
| 2,291,738 | Luth et al. | Aug. 4, 1942 |
| 2,362,269 | Hall | Nov. 7, 1944 |
| 2,414,672 | Sauer | Jan. 21, 1947 |
| 2,473,722 | Nelson | June 21, 1949 |
| 2,874,964 | Edwards | Feb. 24, 1959 |

OTHER REFERENCES

Modern Plastics, Encyclopedia Issue, September 1956, pages 140–141 cited.

Polyesters and their applications, 1956, pages 137, 145, and 175 cited.